3,141,896
PROCESS FOR THE PERCARBOXYLIC ACID EPOX-
IDATION OF OLEFINS IN THE PRESENCE OF
AN ALUMINUM OXIDE CATALYST
Werner Stein, Dusseldorf-Holthausen, and Rolf Brockmann, Haan, Rhineland, Germany, assignors to Henkel & Cie, G.m.b.H., Dusseldorf-Holthausen, Germany, a German corporation
No Drawing. Filed Mar. 2, 1960, Ser. No. 12,244
Claims priority, application Germany May 31, 1958
13 Claims. (Cl. 260—348.5)

This invention relates to and has as its object a method for the epoxidation of compounds having olefinic double bonds. The application is a continuation-in-part of application Serial No. 806,209, now abandoned, filed April 14, 1959.

Mono-, di- and polyepoxy compounds have during the course of time obtained increasing significance as softening and/or stabilizing agents for polymerizates, and particularly for such use in connection with halogen-containing vinyl-polymerizates. Additionally, epoxy-containing compounds represent valuable intermediates for use in organic syntheses and further serve as the starting material in the production of synthetics.

The epoxy compounds have previously been prepared by reacting the corresponding unsaturated starting material with an organic peracid. In carrying out such reaction, it is not necessary to start with the organic peracid per se, but rather the peracid may be formed in situ by reacting an organic acid with hydrogen peroxide to thereby form the organic peracid, which is then reacted with the olefinic compound.

As starting organic acids there may be used, for example, formic acid, acetic acid and the higher homologues thereof. The epoxidation reaction is frequently accelerated, employing for this purpose catalysts, such as mineral acids as, for example, sulfuric acid, and additionally cation exchangers have been used as catalysts. While these catalysts accelerate the reaction, their use under certain conditions has certain disadvantages, namely that they give rise to numerous side-reactions. The same consist essentially in a splitting of the epoxy ring with the production of undesired by-products, which in turn results in the impairment of the purity of the epoxides obtained in the reaction and also has an unfavorable influence on the properties of the resulting epoxides. Thus, for example, in the instance where the epoxides are to be used as softeners, the compatibility thereof with the high polymers is lessened and accordingly the properties of the softened product are deteriorated. When formic acid is used as the oxidizing agent, catalysts are not necessary. However, undesirable side-reactions still are observed to take place. The use of cation exchangers as catalytic agents have the further disadvantage that they are subject to attack by the reaction medium, so that their use is in addition uneconomical.

In accordance with the invention, it has now been found that the disadvantages of the known processes may be avoided if the epoxidation is effected by reacting an organic acid and hydrogen peroxide with a compound having olefinic unsaturation, i.e. olefinic double bonds, in the presence of an aluminum compound which, from its chemical structure, may be regarded as a dehydration product of aluminum hydroxide and which, from its chemical composition and/or structure, lies within the range of aluminum oxides which vary in water content from $Al_2O_3 \cdot 2H_2O$ to $\gamma\text{-}Al_2O_3$. In accordance with the invention, side-reactions are substantially avoided, even in those instances where reaction temperatures are used which in the conventionally known epoxidation reactions have resulted in increased side-reactions and thereby to marked diminution of the yields. Thus, the process of the invention for the first time avoids the side-reactions attendant in the use of catalysts and also makes possible the use of relatively high epoxidation temperatures without any disadvantageous side-reactions.

It has further been discovered that the known processes may be substantially improved, i.e. the epoxidation effected by reacting an organic acid and hydrogen peroxide with a compound having olefinic unsaturation, regardless of the catalyst used, if during the reaction the water introduced with the reactants and formed in the reaction is distilled off from the reaction mixture at a temperature below 100° C. during the reaction, employing for that purpose an inert solvent which serves as an entraining agent for the water. If in place of the conventional catalysts there are utilized the aluminum compounds which, from their structure, may be regarded as dehydration products of aluminum hydroxide, then additional advantages are enjoyed, as for example the reaction time is shortened, dilution of the reaction mixture is avoided, etc.

The starting unsaturated materials may be any organic compound which contains at least one olefinic, that is to say one ethylenic double bond between 2 carbon atoms in an aliphatic or cycloaliphatic group in its molecule. Included in the term "olefinic double bonds," as used herein, are the double bonds found in aliphatic carbon chains or in cycloaliphatic and particularly in hydroaromatic compounds.

The reaction process in accordance with the invention is largely independent of the molecular size of the starting material, and there may be used in the process in accordance with the invention unsaturated materials having comparatively low molecular weights as well as high molecular weight materials, only in that they contain at least one olefinic i.e., carbon to carbon, double bond. It has been found advantageous, however, to employ unsaturated compounds, the molecular weight of which is that high that the boiling point of the starting material to be epoxidized does not at normal pressure lie below 50° C. Under these circumstances, the starting unsaturated material will not be distilled off from the reaction mixture and/or small amounts of distilled-off starting material may by working under reflux be easily returned to the reaction mixture. If the embodiment followed is that in which the water introduced into the reaction and the water formed in the reaction is distilled off from the reaction mixture, then it must be provided that the boiling point of the unsaturated material does not lie below the boiling point of the inert solvent employed as the entrainant. By making sure that the boiling point of the unsaturated compound is above that of the inert solvent employed, it is assured that little or no unsaturated compound is removed by distillation from the reaction and/or small amounts of distilled-off starting material may, by working under reflux, be easily returned to the reaction mixture.

The unsaturated materials, which may be epoxidized in accordance with the invention, cover a wide range of chemical classes. The starting materials can be straight-chained or branch-chained olefins, the double bond or bonds of which may be positioned at any point in the carbon chain. When the starting material is a hydrocarbon, there are preferably used those hydrocarbons which contain at least six carbon atoms in the molecule. The olefins and/or materials from which these olefins are produced may be of natural or synthetic origin. Olefins, which have recently become readily accessible and which may be used in the instant process, are the di-, tri-, tetra- or penta-propylenes obtained through the polymerization of propylene.

In addition to the hydrocarbons mentioned above, it is also possible to use unsaturated alcohols as the starting materials, as for example such alcohols as allyl alcohol, crotyl alcohol, oleyl alcohol etc. The starting olefinic material may also be an aldehyde, such as for example crotonaldehyde. There may also be used ethers of unsaturated alcohols, of which at least one alcohol residue must be unsaturated. Such ethers include the ethers of allyl alcohol, crotyl alcohol and oleyl alcohol with alcohols, and in particular alipihatic alcohols having from 1–20 carbon atoms in their molecules. Examples of these ethers, in which both alcohol residues are derived from unsaturated alcohols, include diallyl-ether, dicrotyl ether or dioleyl ether. Additionally, esters of unsaturated alcohols, and in particular aliphatic alcohols having from of which the carboxylic acid component may also contain epoxidizable double bonds.

The starting material may also be an unsaturated carboxylic acid. In the epoxidation of free carboxylic acids, however, the free carboxyl groups may react with the already formed epoxy groups, and therefore the carboxylic acids are preferably used in the form of their esters. The esters may be esters of the acids with 1- to 6-valent alcohols. The alcohol component of the ester may possess epoxidizable double bonds. In addition to the carboxylic acids and their esters, the corresponding anhydrides, amides or nitriles may be used as starting material in the reaction in accordance with the invention.

Particularly preferable starting materials to be used for the process in accordance with the invention are unsaturated products derived from natural sources, and in particular fats which, as is known, contain considerable amounts of unsaturated materials. These include the unsaturated fatty acids and also the unsaturated fat alcohols which are to be found in nature as esters, and in particular those esters in which the fatty acid residues and/or fat-alcohol residues contain from 8 to 30 and preferably 10 to 24 carbon atoms. Unsaturated fatty acids, which occur in form of glycerides, and also the esters of fatty acids with fat alcohols are readily available and accordingly lend themselves to use in the reaction. The natural products may be derived from plant or from land or marine animal sources. However, there may be used such materials as are formed from such natural products, insofar as they have not lost their unsaturated character.

Finally, even the most varied polymers may be epoxidized as much as they possess olefinic—i.e., carbon to carbon double bonds and are liquid at the reaction temperature or soluble in an inert organic solvent. As examples of such compounds there may be mentioned the esters of unsaturated carboxylic acids and polyvinyl alcohol, polyesters formed from diols and dicarboxylic acids, at least one of the two esterification components containing unsaturated bonds, and polycyclohexenepolymethylene as disclosed in the German Patent No. 864,-300. These more or less higher molecular substances should contain per i.e., olefinic double bond at most 30, and preferably at most 20 carbon atoms.

Thus, it can be seen that the starting materials, which can be used in accordance with the invention, may be defined as organic materials having aliphatic or carbon to carbon double bonds, which contain per double bond at most 30, preferably not more than 20, carbon atoms and which boil at normal pressures at temperatures above 50° C.

Very often the organic compounds suitable for use as starting materials in accordance with the invention are found in admixtures which do not consist exclusively of unsaturated compounds. This is true, for example, of paraffin-hydocarbons which are obtained in the known manner from saturated hydrocarbons or from natural fatty products. The epoxidation of the unsaturated materials can in those cases be carried out even when the same are present in conjunction with saturated, non-epoxidizable materials. For practical reasons, however, there should preferably be employed such mixtures which contain at least 30, preferably 50–80, weight percent of unsaturated epoxidizable compounds in relation to non-epoxidizable inert substance.

The unsaturated starting materials are preferably epoxidized, when present in such mixtures, employing inert solvents. The inert solvents which may be used include for example benzol, toluol, aliphatic hydrocarbons, ethers, esters, etc. There are preferably used those solvents which boil below 120° C. and preferably below 100° C. In general, the amount of solvent used should exceed by not more than five times the amount of the epoxidizable material contained in the admixture.

If, in conducting the reaction as described above, in which the water present and formed is distilled off from the reaction mixture, employing for that purpose an inert solvent as an entraining agent for the water, the reaction is not effected starting with the organic peracid per se, but rather organic acid is reacted with hydrogenperoxide to form the organic peracid, i.e. the organic peracid is formed from formic acid, acetic acid, propionic acid and higher homologues thereof, benzoic acid, etc., then it is advisable to employ catalysts for the acceleration of the reaction. For this purpose, catalysts such as the strong water-soluble inorganic and organic acids or their halides, as for example mineral acids, phosphoric acid, nitric acid, sulfuric acid, perchloric acid, borontrifluoride-water-adducts, have proven effective. In addition, acid phosphoric acid esters, p-toluol-sulfonic acid or other sulfonic acids and such water- insoluble acid substances as, for example, the conventional organic base exchange agents prepared from synthetic resins have been used to accelerate the epoxidation reaction. The use of an accelerating agent is not necessary if the starting organic acid is formic acid, formic acid being sufficiently active itself and there being no requirement for an accelerator to form the organic peracid. The amount of the water-soluble catalysts required to be present in the reaction mixture of organic acid and aqueous hydrogenperoxide is in general 0.5–5 weight percent, referred to the reaction mixture. The water-insoluble activators are employed in amounts of from about 5 to 30 g. of dry substance per mol of simple unsaturated compound used in the reaction.

The hydrogen peroxide employed in the reaction is in general used in those concentrations which are readily available. Thus, concentrations of between 30 and 70 weight percent of $H_2O_2$ are most preferably used. However, lower and higher concentrations of the peroxide, as for instance 90% by weight of peroxide, may be used with satisfactory results. The hydrogen peroxide is used in quantities of 1–2, preferably 1–1.5 molecules of $H_2O_2$ for each double bond which is to be epoxidized.

As organic acids, which are suitable for conversion into peracids and which during the reaction serve to transfer oxygen to the double bond, there may be employed mono-, di- or poly-carboxylic acids. Examples of organic acids, which may be employed in the epoxidation reaction in accordance with the invention, include succinic acid, adipic acid, maleic acid or their halogen-substitution products, fumaric acid, citric acid, acetone-dicarboxylic acid, sebacic acid, phthalic acids, benzolpolycarboxylic acids or their halogenation products, polyacrylic acids or others, polycondensation products containing several carboxylic groups, base exchange resins containing carboxylic groups, etc. It is also possible to use for the epoxidizing mixtures of mono-, di- or poly-carboxylic acids. The organic acids are preferably employed in an amount of about 0.1–1 equivalent and preferably in an amount of 0.2–0.5 equivalent per mole of unsaturated substance.

The aluminum compounds, used as catalysts in accordance with the invention when the distillation step is omitted and preferably when the same is included, are to be considered chemically as dehydration products of aluminum hydroxide and in chemical composition and crystalline structure lie within a range extending from $Al_2O_3.2H_2O$ to $\gamma Al_2O_3$. The applicability of these compounds, which hereafter for the sake of simplicity will be designated as "aluminum oxides," is within wide limits independent of their particle size.

The aluminum oxide catalysts used in accordance with the invention are readily obtained by dehydration of aluminum hydroxide. The dehydration of the aluminum hydroxide should be effected at temperatures of at least 200° C. and preferably at temperatures between 300 and 600° C. However, aluminum oxide products may be used which have been dehydrated at temperatures up to 800° C., the heating having been regulated so that the desired dehydration of the aluminum hydroxide takes place, but not the complete conversion of the product into $\alpha$-$Al_2O_3$, i.e. that the $Al_2O_3$ products recovered still contain $\gamma$-$Al_2O_3$. The dehydration is carried out so that at least $Al_2O_3.2H_2O$, and preferably $Al_2O_3.H_2O$ (boehmite) results. In many cases, particularly when the dehydration has taken place at temperatures of 400–500° C., the dehydration results in products which are a mixture of boehmite and $\gamma$-$Al_2O_3$. Such mixtures are most excellently suited as catalysts for the process in accordance with the invention.

Many of the technically available aluminum hydroxides and/or aluminum oxides contain as impurity a small alkali content. Aluminum oxides having an alkali content have proved particularly preferable in the process in accordance with the invention. If aluminum oxides, which do not have such an alkali content, are employed, it may be desirable to provide for a small alkali content by adding to the aluminum hydroxide before or during the dehydration or to the already dehydrated product some alkali, as for example in the form of a hydroxide, carbonate or bicarbonate of sodium or potassium. However, the alkali may be added separately from the aluminum oxide to the reaction mixture.

The structure of the aluminum oxide is easily determined through X-ray photograph techniques, as for example employing the procedure of Debye-Scherrer. The following table depicts for two effective aluminum oxide preparations the characteristic strong to medium-strong X-ray interferences; the value indicating in Angstrom the bedding plane distances corresponding to the X-ray interferences:

CATALYTICALLY EFFECTIVE DEHYDRATION PRODUCTS OF $Al(OH)_3$

BEDDING PLANE DISTANCES IN A. UNITS

| $\alpha$-$Al_2O_3 \cdot 1H_2O$ | $\gamma$-$Al_2O_3$ |
|---|---|
| 6.11 | — |
| 3.164 | — |
| 2.346 | — |
| — | 1.95 |
| 1.860 | — |
| 1.850 | 1.395 |

Since, in accordance with some of the embodiments of the invention, the water formed during the reaction is continuously distilled off, the concentration of the catalyst dissolved in the water present in the reaction would continuously change. Substances volatile with the water, to which belong in addition to the volatile catalysts also the volatile starting organic acids, would be removed from the reaction mixture, while the concentration of non-volatile catalysts dissolved in water would continuously rise, inasmuch as the water loss from the reaction mixture is not equalized by the additions of hydrogen peroxide made during the reaction. The concentration of strongly acid water-soluble activators can lead to undesirable side-reactions. Therefore, it is preferable not to allow the quantity of organic acid present to become decreased and the concentration of strongly acid catalysts to increase to an amount where the proportions above indicated are no longer established. Preferably, every attempt should be made to regulate the reaction so that the quantities and/or concentrations, which have been determined as optimal in the preliminary runs and which may vary from one instance to the other, are maintained.

Strongly acid catalysts, as for example sulfuric acid, are advantageously neutralized in accordance with the above, as the water quantity present in the reaction mixture decreases. For the neutralization of the acids there may be used any desired acid-binding substances of inorganic or organic nature, such as for example the oxides, hydroxides, carbonates and bicarbonates of sodium, potassium, ammonium, the alkaline earth, etc. Preferably the acid-binding substance selected is one which forms with the acids to be removed water-insoluble compounds. Therefore, there may also be used for the neutralization anion exchange materials.

In carrying out the epoxidation reaction, the components may be mixed in any desired sequence. The catalysts to be used are added at least in quantities of 5 weight percent, referred to the starting material to be epoxidized, and preferably in quantities of 10–40 weight percent. Preferably, the starting material to be epoxidized, organic peracid and catalyst, are first admixed and then to this mixture is added the hydrogen peroxide under stirring. The reaction is carried out at a temperature within the range of 20–100° C. and preferably 40–80° C. The temperature of the reaction is selected in dependence on the starting olefinic material, $H_2O_2$ concentration, organic acid, amount of acid catalyst employed, amount of $Al_2O_3$ employed and whether or not a solvent has been used. Accordingly, at the start of the reaction, if necessary, the reaction mixture is brought to the desired reaction temperature by applying heat, and if during the reaction it becomes necessary to lower the temperature, the same is effected by cooling. Further, the reaction temperature is regulated by adding the hydrogen peroxide in dropwise fashion to the other reaction components, and therewith the reaction speed is controlled. It may be desirable to interrupt the addition of the $H_2O_2$ and to add a portion of the $H_2O_2$ remaining only after the reaction has already been started for some time.

The removal of the water from the reaction, i.e. water introduced with the reactants and formed during the reaction, in accordance with the invention, takes place at temperatures below 100° C., as for example at an underpressure in vacuo, preferably with the vapor of an inert organic solvent. Accordingly, the entraining agent employed should not contain any epoxidizable double bonds, except in those circumstances where there is employed for the epoxidation an olefin which is additionally suitable as solvent. In such instances, an excess of the olefin is employed in order to accomplish the removal of the water. The inert solvents suitable for use in the process of the invention may be hydrocarbons of aliphatic, cycloaliphatic and aromatic nature, or they may consist of mixtures of the same. There may additionally be employed as entraining agents halogenated hydrocarbons, symmetrical and unsymmetrical ethers and esters. Hydrocarbon solvents, which are for example utilizable in the invention, are hydrocarbons having from 1–12 carbon atoms in their molecules. Specific examples which may be mentioned are the $C_4$–$C_{12}$ hydrocarbons, such as butane, heptane, isopentane, cyclopentane, cyclohexane, methylcyclohexane, benzol, toluol, xylol, benzine, methylene chloride and chloroform, ethers of the $C_1$–$C_5$ alcohols, such as for example the ethers of methyl, n-butyl, isobutyl, cyclopentyl, tertiary amyl, isoamyl alcohol and glycol, esters of the lower aliphatic $C_1$–$C_4$ organic acids with $C_1$–$C_5$ alcohols, as for example the methyl-n-butyl, isobutyl, secondary butyl, isoamyl ester of formic acid, acetic acid or propionic acid, and other such similar compounds.

Since, as can be appreciated from the foregoing, there are available for the process in accordance with the invention a great number of solvents and solvent mixtures with various boiling points and/or boiling ranges, it is easily possible through the selection of a solvent and/or a solvent mixture with a suitable boiling point and/or boiling range to regulate the desired reaction temperature. Preferably, such a solvent is to be selected, whose boiling point lies, with the reaction conditions employed, below the boiling points of the reaction participants.

In carrying out the epoxidation reaction, the entraining agent and the reaction participants are introduced into the reaction vessel. The reaction mixture is heated to boiling and thereby the water, which before and during the reaction has become part of the reaction medium, i.e. water which is introduced with the starting materials and which is continuously formed during the reaction, is driven off and removed by distillation. The water from the mixture of aqueous acid, olefin, catalyst and solvent may be driven off with the solvent being continuously supplied to the reaction vessel, and thereafter the hydrogen peroxide added in dropwise fashion. The distillation of the solvent-water mixture is maintained during the dropwise addition of $H_2O_2$.

Alternatively, the driving off of the water may take place by effecting a reverse steam distillation. The entraining agent is evaporated outside of the reaction vessel and conducted through the reaction mixture, which is maintained at the desired reaction temperature. The regulation of the desired reaction temperature may be effected through the supply of heat from the outside and/or through the solvent vapors.

The distillation may be carried out under normal pressure. In some cases, i.e. when it is desirable to work at temperatures other than the boiling temperature of the entraining agent, the distillation may be effected with pressure in excess of atmosphere or under vacuum.

The distillate, which is composed in the main of the solvent entraining agent and water, is separated into its constituents, and the solvent is thereafter returned to the reaction.

As in all epoxidation reactions, there may also in the process in accordance with the invention be effected, in addition to the epoxidation, a splitting of the epoxide groups formed, wherein there are formed glycol-mono- or glycol-di-esters of the organic acids present in the reaction mixture. In general, this splitting of the epoxide groups becomes particularly noticeable toward the end of the reaction. The formation of such ester groups may, for example in the production of softeners, be desirable, since the ester groups improve the softener characteristics of the products treated therewith, particularly when the reaction products are esters of acetic acid or higher homologues thereof and esters of di- and poly-carboxylic acids. However, if it is desired to obtain as complete as possible a conversion of the olefinic double bonds of the starting material into epoxide groups, then it is advisable to terminate the reaction when under the reaction conditions selected the maximum obtainable epoxide content has been reached.

If the entraining agent employed is a solvent not miscible with water, then the non-aqueous phase, separated in the condensate, may be separated, dried if necessary and then returned to the reaction vessel during the reaction. On the other hand, if the solvent is miscible with water, then the condensate must, according to the characteristics of the mixture, for example be separated by fractional or azeotropic distillation procedure.

The reaction product is worked up in the known manner. The acid residues are removed by scrubbing with water and alkali. In order to separate the epoxy compounds from the mixture of the reaction products, the reaction mixture may be subjected to distillation, crystallization or extraction and thereby liberate them from the unconverted starting materials or inert impurities. Any solvent still present in the organic phase may be removed by further distillation. The catalyst, when recovered, may be re-used in additional epoxidation reactions. The catalyst, when the same represents a dehydration product of aluminum hydroxide, is regenerated by removing any acid present on the catalyst without the scrubbing thereof, but by subjecting the same to an intensive drying and, if necessary, to heating to the temperature applied in the dehydration of the aluminum hydroxide.

It has already been suggested, in order to produce highly pure solutions of per-acetic and per-propionic acid, that the formation of organic per acids be carried out with azeotropic removal of water present in the reaction mixture. In the known process, there were employed strongly acid catalysts, and in this connection it was found that the presence of hydrogen peroxide and acetic acid is undesirable when the per-acid formed was to be used for the epoxidizing of unsaturated compounds. These admixtures served to catalyze in connection with sulfuric acid present or other strongly acid catalyst the ring-splitting of the epoxide, a disadvantage which was not eliminated by neutralization of the strong acid, for example sulfuric acid, since the salt of sulfuric acid thereby obtained also represents a catalyst for splitting the epoxide ring. In view of these findings, it was most surprising and not to be expected that substantially improved results are obtained under the conditions of the process in accordance with the invention, as compared with the known epoxidation procedure.

As a result of the distilling off of the water, the reaction time is considerably shortened. Thus, for example, the oxidation time drops in the reaction of acetic acid, hydrogen peroxide and ion exchanger to approximately one half of the time which is required to complete the reaction without the distilling off of the water. This shortening of the reaction time is particularly valuable if the process is carried out continuously. If necessary, it is possible to carry out the process in accordance with the invention at lower temperatures than those required in effecting the reaction without the removal of the water, while under otherwise similar conditions the same, if not better, yields of epoxide are obtained. A further advantage of the process in accordance with the invention consists in that the dilution of the reaction mixture by water is counteracted. In contrast, in the known epoxidation reaction, the dilution becomes more marked and is conductive to splitting of the epoxide groups which have been formed.

The following examples are given to further illustrate the invention, but not to limit the same.

The procedures disclosed in the Examples 1–16 were carried out, employing a three-necked flask, which could be heated in a water bath or cooled with water and which was provided with stirrer, thermometer and drop funnel. Certain of the catalysts used in the examples were produced by dehydration of aluminum hydroxide at temperatures of 300 and/or 400° C., and these showed in the Debye-Scherrer X-ray picture the typical interferences of boehmite; the characteristic interference of $\gamma$-$Al_2O_3$ at 1.96 A. was already slightly discernable, some $\gamma$-aluminum oxide having been formed in small amounts in the dehydration. A commercially available aluminum oxide had unusually weak, but distinctly distributed X-ray interferences, which were partly due to the presence of boehmite and partly to $\gamma$-aluminum oxide. The weakness and the distribution of the interferences could be taken as an indication that a large part of the preparation consisted of particles with such small crystal dimensions that the same could be considered as X-ray amorphous. Preparations dehydrated at 500 and/or 600° C. consisted preponderantly of $\gamma$-aluminum oxide with small amounts of boehmite, but were equally usable as catalysts.

*Example 1*

200 g. of soy oil (iodine number=128), corresponding to 1 mol of a mono-unsaturated compound, was heated following the addition of 30 g. of glacial acetic acid (0.5 mol) and 35 g. of commercial aluminum oxide in finely powdered form to 70° C. After reaching this temperature, 75 g. of 50% hydrogen peroxide (1.1 mol) was added drop by drop over a period of 2 hours. After 8 hours there was slowly added 34 g. (0.5 mol) of the 50% hydrogen peroxide, and the mixture was stirred further to make a total reaction time of 23 hours. During all this time, the temperature was maintained at 70° C. The reaction product was scrubbed with water until all of the aluminum oxide had passed into the aqueous phase. After separation of the oil from the aqueous phase, the latter was scrubbed until a neutral reaction was reached and dried at temperatures not over 70° C. in vacuum. There was obtained a light-yellow, slightly viscous soy oil epoxide having 6.15% epoxy oxygen and an iodine number of 2.3.

*Example 2*

The procedure described in Example 1 was repeated. However, 50 g. of aluminum oxide were charged to the flask, which aluminum oxide had been obtained by heating finely powdered technical aluminum hydroxide in an open porcelain dish with the flame of a Bunsen burner. After a total reaction time of 21.5 hours, a soy oil epoxide with an epoxy oxygen content of 6.29% and an iodine number of 1 was obtained.

*Example 3*

The reaction mixture described in Example 1 was employed. The aluminum oxide was produced by dehydration of a finely powdered aluminum hydroxide at 400° C. up to a weight loss of 30%. The mixture of soy oil, glacial acetic acid and aluminum oxide was heated to 75° C. and then 1.1 mol of 50% hydrogen peroxide was added slowly drop by drop. After 6 hours of stirring of the reaction mixture, a further addition of 0.5 mol of hydrogen peroxide was made. After a total reaction time of 12 hours, the reaction mixture was processed as described in Example 1. The soy oil epoxide obtained had an epoxy oxygen content of 6.49% and an iodine number of 4.3. This corresponds to a yield of 87.3%.

A further procedure was carried out, employing an aluminum oxide dehydrated at 500° C. (weight loss 33%), but otherwise under the same conditions. An epoxy product was obtained having an epoxy oxygen content of 6.5% and an iodine number of 2.

The procedure was then repeated without any addition of aluxinum oxide, and there was recovered a soy oil epoxide having only 4.2% epoxy oxygen content and an iodine number of 54.

*Example 4*

1 kg. of the soy oil, as used in the previous examples, 150 g. of glacial acetic acid and 175 g. of aluminum oxide were mixed with one another and heated to 75° C. There were then added 4.5 mol of 50% hydrogen peroxide (306 g.) slowly drop by drop. A slight temperature increase occurred, and the temperature was maintained at 75° C. by cooling. After 5 hours, a further 2 mol of hydrogen peroxide were added drop by drop. The total reaction time was 15 hours. The soy oil epoxide obtained contained 6.0% epoxy oxygen and had an iodine number of 4.7.

*Example 5*

A reaction mixture according to Example 1 was used, the aluminum oxide being obtained through dehydration of finely powdered aluminum hydroxide at 300° C. up to a weight loss of 26.8%. The reaction was carried out at 75° C. There were slowly added drop by drop 75 g. (1.1 mol) of 50% hydrogen peroxide, and after 4 hours a further 0.5 mol of $H_2O_2$ were added. After a total reaction time of 12 hours, the reaction product was processed as described in Example 1. The soy oil epoxide obtained contained 6.3% epoxy oxygen and had an iodine number of 2.7.

*Example 6*

203 g. of soy oil fatty acid methylester (iodine number 125=1 mol of unsaturated substance), 30 g. of glacial acetic acid, 35 g. of aluminum oxide (prepared according to Example 3) and 200 g. of benzol were mixed together and heated to 75° C. There were then slowly added drop by drop 68 g. of 50% hydrogen peroxide (1 mol) and after 6 hours an additional 0.5 mol of $H_2O_2$. After a total reaction time of 18 hours the reaction mixture was processed in the afore-described manner. The epoxidation product contained 5.7% epoxy oxygen and had an iodine number of 6.3.

When the reaction was carried out without the addition of any aluminum oxide, a product was obtained with an epoxy oxygen content of 3.2% and an iodine number of 4.9.

*Example 7*

268 g. of technical oleyl alcohol (iodine number 91=0.96 mol of unsaturated substance), 30 g. of glacial acetic acid and 35 g. of aluminum oxide (prepared according to Example 3) were mixed with 220 cc. of benzol. The mixture was heated to 75° C. and thereafter was added drop by drop 68 g. (1 mol) of 50% hydrogen peroxide. After 6 hours, a further addition of 0.5 mol of $H_2O_2$ was effected. After a total reaction time of 16 hours, the mixture was processed as described in the preceding examples. The recovered epoxidized oleyl alcohol had an epoxy oxygen content of 3.75% and an iodine number of 21.7.

When the reaction was effected without aluminum oxide, the reaction product contained only 1.3% epoxy oxygen and had an iodine number of 57.6.

*Example 8*

156 g. of oleic acid nitrile (iodine number 81.5=0.5 mol of unsaturated substance), 15 g. of glacial acetic acid (0.25 mol) and 17.5 g. of aluminum oxide (prepared according to Example 3) were treated at 75° C. by adding first slowly drop by drop 34 g. (0.5 mol) of 50% hydrogen peroxide and again after 6 hours 0.25 mol of $H_2O_2$. After a total reaction time of 12 hours, the mixture was processed as described above. The reaction product contained 3.8% epoxy oxygen and had an iodine number of 12.5.

*Example 9*

246 g. of terephthalic acid diallylester (iodine number 203=1 mol of ester corresponding to 2 mol of a monounsaturated substance) and 60 g. of glacial acetic acid were dissolved in 200 cc. of benzol and treated with 70 g. of aluminum oxide (prepared according to Example 3). After heating to 75° C., there was first added drop by drop 136 g. (2 mol) of 50% hydrogen peroxide and after 6 hours a further 1 mol of $H_2O_2$. After a total reaction time of 22 hours, the mixture was processed. The reaction product contained 5.8% of epoxy oxygen and had an iodine number of 90.

From the raw product thus obtained it was possible to obtain in pure form the terephthalic acid diglycide ester through recrystallization. When the same procedure was repeated without the addition of aluminum oxide, the reaction product contained only 1% epoxy oxygen and had an iodine number of 160.

*Example 10*

To 208 g. of a $C_{10}$-olefin fraction having a terminal double bond (iodine number 122=1 mol of a monounsaturated substance), 30 g. of glacial acetic acid and 35 g. of aluminum oxide (prepared as described in Example 3) there were added dropwise at 75° C., 68 g. of 50% hydrogen peroxide (1 mol) and after 6 hours a further 0.5 mol of $H_2O_2$. After a total reaction time of 18 hours, the mixture was processed in the manner previously described. The reaction product contained 3.9% epoxy oxygen and had an iodine number of 33.

By distillation, the hydrocarbons were separated from the epoxy compound.

When the process was repeated without any addition of aluminum oxide, then the reaction product contained only 1.1% epoxy oxygen and had an iodine number of 47.

*Example 11*

A mixture of 290 g. of a $C_{10}$-olefin fraction with a centrally located double bond (iodine number 87.6=1 mol of a mono-unsaturated compound), 30 g. of glacial acetic acid and 35 g. of aluminum oxide (prepared as described in Example 3) was treated at 75° C. by a dropwise addition of 68 g. of 50% hydrogen peroxide (1 mol) and, after 6 hours, by a further addition of 0.5 mol of $H_2O_2$. The reaction product obtained after a total reaction time of 18 hours and following processing contained 3.7% epoxy oxygen and had an iodine number of 23.3.

When the procedure was carried out without the addition of aluminum oxide, then there was obtained a reaction product with an epoxy oxygen content of 1.5% and an iodine number of 40.6.

*Example 12*

A mixture of 200 g. of soy oil (iodine number 128=1 mol of a mono-unsaturated substance), 44 g. of butyric acid (0.5 mol) and 35 g. of aluminum oxide (prepared as described in Example 3) was treated at 75° C. by addition thereto of 68 g. (1 mol) of 50% hydrogen peroxide and, after 6 hours, with further 0.5 mol of $H_2O_2$. After a total reaction time of 22 hours, the mixture was processed as usual. There was obtained a soy oil epoxide with 2.7% epoxy oxygen content and an iodine number of 35.6.

In a comparison procedure without any aluminum oxide addition, a soy oil epoxide was obtained which contained 1.9% epoxy oxygen and had an iodine number of 50.2.

*Example 13*

A mixture of 200 g. of soy oil, as described in the preceding examples, 73 g. of adipic acid (0.5 mol), 30 g. of water and 35 g. of aluminum oxide (prepared according to Example 3) was heated to 80° C. To the reaction mixture there was slowly added drop by drop 75 g. (1.1 mol) of 50% hydrogen peroxide and after 6 hours a further 0.3 mol of $H_2O_2$. After a total reaction time of 12 hours and the conventional processing, a soy oil epoxide was obtained which contained 3.6% of epoxy oxygen and had an iodine number of 69.4.

In a comparison run without the addition of aluminum oxide, there was obtained a soy oil epoxide having a content of epoxy oxygen of 1.7% and an iodine number of 101.5.

*Example 14*

A reaction mixture according to Example 1 was used. The $Al_2O_3$ was recovered from the previous mixture and reactivated by heating at 400° C. The reaction was carried out at 75° C. There were first added 75 g. (1.1 mol) of 50% hydrogen peroxide slowly drop by drop and after 5 hours a further 0.5 mol of $H_2O_2$. After 12 hours of reaction time, the reaction mixture was processed as described in Example 1. The soy oil epoxide contained 5.9% epoxy oxygen and had an iodine number of 15.

*Example 15*

The procedure described in Example 3, paragraph 1, was repeated, employing a 75% hydrogen peroxide. After 4 hours a further 0.5 mol of $H_2O_2$ was added drop by drop. The total reaction time was 6 hours. The processed soy oil epoxide had an epoxy oxygen content of 6.1% and an iodine number of 9.

*Example 16*

The reaction mixture described in Example 1 was used. The aluminum oxide was produced through dehydration of aluminum hydroxide of highest purity, alkali-free (Merck) at 400° C. to a weight loss of 31%. The mixture of soy oil, glacial acetic acid and aluminum oxide was heated to 75° C. 68 g. (1 mol) of 50% hydrogen peroxide were added slowly drop by drop. After 5 hours of stirring, a further 0.5 mol of $H_2O_2$ was added. After a total reaction time of 12 hours the reaction mixture was worked, as described in Example 1. The soy oil epoxide had an epoxy oxygen content of 6% and an iodine number of 18.

When to this reaction mixture 0.72 g. of soda were added, then there was obtained under otherwise similar conditions a soy oil epoxide with an iodine number of 5 and an epoxy oxygen content of 6.4%.

When there was added to the reaction mixture 0.72 g. of soda, but no aluminum oxide, then the soy oil epoxide under the otherwise similar working conditions had an iodine number of 83 and an epoxy oxygen content of 2.8%.

*Example 17*

To 35 g. of aluminum oxide, 1.4 g. of $K_2CO_3$ and 30 g. of glacial acetic acid (0.5 mol) were added 200 g. of soy oil (1 mol unsaturated substance) and 200 cc. of benzol. The mixture was heated under stirring so that the benzol-water mixture distilled off through a small column. The distillation was maintained in effect through the entire course of the reaction. From the condensate the water was separated, and the solvent was returned into the reaction flask. Over a period of 1½ hours, 68 g. (1 mol) of 50% $H_2O_2$ was added drop by drop and after 4 hours a further 0.3 mol of $H_2O_2$. The temperature in the reaction vessel standardized itself at from 81 to 82° C. After a total of 8 hours, approximately 66 cc. of the aqueous phase had been separated and the aluminum oxide was separated from the reaction product. The acetic acid was washed out with soda solution and the benzol was distilled off in vacuum. As end product there was obtained 195 g. of a soy oil epoxide having 6% epoxy oxygen and an iodine number of 3.0.

When the above reaction was carried out, employing the above mentioned starting materials and under substantially similar conditions, the mixture being boiled at reflux so that the water remained in the reaction medium during the entire course of the reaction, there was obtained a soy oil epoxide having 5.1% epoxy oxygen and an iodine number of 32.

*Example 18*

279 g. of oleic acid (iodine number 91=1 mol), 30 g. of glacial acetic acid (0.5 mol), 35 g. of aluminum oxide, 1 g. of $Na_2CO_3$ and 400 cc. of benzine (boiling range 35–65° C.) were mixed, heated while stirring and treated further in the manner described in Example 17. 68 g. (1 mol) of 50% $H_2O_2$ was slowly added drop by drop to the reaction mixture. After 5¾ hours, a further 0.5 mol of $H_2O_2$ was added to the reaction mixture. The temperature in the reaction vessel standardized itself at 59° C. After a total of 10 hours, approximately 70 cc. of an aqueous phase were distilled off. The processing of the reaction products took place as described in Example 17. In this instance, the acetic acid was neutralized with sodium bicarbonate solution. The epoxy-stearic acid partially crystallized out after the removal of the solvent. The end product had the characteristics of 3.3% epoxy oxygen and an iodine number of 7 and an acid number of 163.

*Example 19*

246 g. of diallylterephthalate (2 mol unsaturated substance), 70 g. of aluminum oxide, 60 g. of glacial acetic acid (1 mol), 2 g. of $Na_2CO_3$ and 300 cc. of methylenechloride were mixed together and the mixture was heated. The reaction was carried out as described in Example 17. 204 g. (3 mol) of 50% $H_2O_2$ were added drop by drop over a period of 3½ hours. The temperature in the reaction vessel was 50° C. After a total of 19 hours had elapsed, 115 cc. of water had been separated. The contents of the reaction vessel were processed as described in Example 17. A reaction product was obtained having 6.1% epoxy oxygen and still possessing an iodine number of 75.

Example 20

170 g. of a $C_{11}$ olefin-paraffin mixture (double bond positioned at the end of the molecule, iodine number of 149 and equal to 1 mol of unsaturated substance), 30 g. glacial acetic acid, 35 g. of aluminum oxide, 1.4 g. of $K_2CO_3$ and 200 cc. of benzol were mixed and heated while stirring to 63–65° C. In a vacuum of 360–380 mm. Hg, the solvent $H_2O$ mixture was distilled off. 68 g. (1 mol) of 50% $H_2O_2$ were added slowly drop by drop to the reaction mixture. After 6 hours, a further 0.5 mol of $H_2O_2$ was added. After a total reaction time of 21 hours, 64 cc. of an aqueous phase had been separated. The contents of the reaction vessel, by the addition of a further quantity of benzol, were separated into an aqueous phase and a solvent phase. After washing and drying of the solution of the epoxide in the benzol, there were obtained 348 g. of solution having a content of 2.7% epoxy oxygen.

Example 21

498 g. of a $C_{11}$ olefin-paraffin mixture (double bond positioned at the end of the molecule, iodine number of 152.9 and equivalent to 3 mol of unsaturated substance), 30 g. of glacial acetic acid, 35 g. of aluminum oxide and 1.4 g. of $K_2CO_3$ were mixed and heated to 85° C. while stirring. 68 g. (1 mol) of 50% $H_2O_2$ were added to the reaction mixture drop by drop over a period of 5 hours. Simultaneously, there was distilled off at a pressure of 240 mm. Hg an olefin-paraffin water mixture, and the water was separated therefrom. The olefin-paraffin mixture was returned to the reaction vessel. After a total reaction time of 7½ hours had elapsed, 54 cc. of water had been separated. The reaction mixture was processed as described in Example 17. The end product recovered contained 1.34% epoxy oxygen and still possessed an iodine number of 123. The yield, referred to $H_2O_2$, amounted to 46%.

Example 22

200 g. of soy oil (1 mol of unsaturated substance), 17.5 g. (0.12 mol) of adipic acid, 12.5 g. of a cation exchanger based on polystyrene sulfonic acid (commercial product Lewatit S 100) in the acid form and 200 cc. of benzol were mixed and heated to 65° C. while stirring. 74.8 g. (1.1 mol) of 50% $H_2O_2$ were added to the reaction mixture within 3 hours. Simultaneously, there was slowly distilled off through a small column a benzol-water mixture at a pressure of 410 mm. Hg. From the distillate, the water was separated and the benzol returned to the reaction flask. After 4¼ hours had elapsed, the soy oil had an epoxy oxygen content of 4.2%. The iodine number at this time still amounted to 49. After a total of 12 hours had elapsed, 45 cc. of water were separated. The soy oil epoxide then possessed 6.2% epoxy oxygen and had an iodine number of 7. The processing of the reaction product recovered was carried out as described in Example 17.

Example 23

200 g. of soy oil (1 mol of unsaturated substance), 30 g. of glacial acetic acid, 25 g. of the cation exchanger as used in Example 22 and 200 cc. of benzol were heated to 62° C. while stirring. 74.8 g. of 50% $H_2O_2$ (1.1 mol) were added to the reaction mixture drop by drop over a period of one hour. At a pressure of about 400 mm. Hg, a benzol-water mixture distilled off. After separation of the water, the benzol was returned into the reaction vessel. An otherwise completely analogous procedure was carried out without driving off of the water. The following table shows the epoxide contents and iodine numbers of the specimens taken from time to time. The processing of the reaction products was carried out as described in Example 17.

| Reaction product withdrawn (hours after start of reaction) | Water not driven off | | Water driven off | | |
|---|---|---|---|---|---|
| | EpO | Iodine No. | EpO | Iodine No. | H₂O separated, cc. |
| 2 | 4.5 | 39 | 6.05 | 20 | 30 |
| 3 | 5.5 | 23 | 6.45 | 9 | 41 |
| 3.5 | 5.7 | 19 | 6.50 | 5 | 45 |
| 6 | 6.2 | 8 | | | |

Example 24

200 g. of soy oil (1 mol of unsaturated substance), 14.2 g. of cane sugar, 2 g. of phosphoric acid (84.5%), 27.2 g. of 50% $H_2O_2$ (0.4 mol) and 200 cc. of benzol were heated to 65° C. under stirring. After 2 hours, 68 g. (1 mol) of $H_2O_2$ where added to the reaction mixture drop by drop over a period of 2 hours and simultaneously there was distilled off a benzol-water mixture at a pressure of about 430 mm. Hg. The benzol, which separated from the water, was returned to the reaction vessel. The processing of the reaction products, which were withdrawn from the reaction vessel, was carried out according to the procedure set forth in Example 17. The following table shows the epoxide contents and the iodine numbers of the reaction products analyzed:

| Reaction product withdrawn (hours after start of reaction) | EpO | Iodine Number | H₂O separated, cc. |
|---|---|---|---|
| 5 | 3.8 | 45 | 20 |
| 7 | 5.2 | 25 | 30 |
| 9 | 5.6 | 18 | 40 |

Example 25

200 g. of soy oil (1 mol of unsaturated substance), 30 g. of glacial acetic acid, 2 g. of concentrated sulfuric acid (40.4 mval.) and 200 cc. of benzol were heated to 60° C. while stirring. 81.6 g. (1.2 mol) of 50% $H_2O_2$ were added to the reaction mixture over a period of 2 hours. Simultaneously there was slowly distilled off a benzol-water mixture at a pressure of 390 mm. Hg. The benzol was returned to the reaction vessel after it had been separated from the water. After two hours, there was added drop by drop a 4 N solution of caustic soda, in order to keep the sulfuric acid concentration (referred to the water and $H_2O_2$ present in the mixture) approximately constant. The theoretical starting concentration of the sulfuric acid amounted to 2.4%, calculated as if all $H_2O_2$ had been added at the start of the reaction. After 2 hours, about 20 cc. of water had been driven off and ⅗ of the $H_2O_2$ had been used up, so that the sulfuric acid concentration had risen to 3.8%. By the addition of the caustic soda liquor, this value was substantially maintained, by adding for every 10 cc. of water distilled off 2 cc. of the liquor. The entire procedure was repeated, but without the driving off of any water and without the addition of any liquor. The following table shows the results of analytical procedures carried out in both instances. The reaction products were worked up as described in the previous examples.

| Reaction product withdrawn (hours after start of reaction) | Water not driven off | | Water driven off | | |
|---|---|---|---|---|---|
| | Iodine No. | EpO | EpO | Iodine No. | H₂O separated cc. |
| 2 | 48 | 3.9 | 4.6 | 36.5 | 20 |
| 3 | 32 | 4.7 | 5.3 | 24 | 30 |
| 3.5 | 26 | 4.9 | 5.4 | 20 | 36 |

We claim:

1. In a process for preparing epoxidized products by reacting ethylenic compounds selected from the group consisting of monoethylenically and polyethlenically unsaturated aliphatic, cycloaliphatic, and aromatic hydrocarbons and monoethylenically and polyethylenically unsaturated alcohols, ethers, acids, esters, and ether-alcohols with an organic percarboxylic acid in the presence of a catalyst, the improvement which comprises reacting such an ethylenically unsaturated compound with an organic percarboxylic acid at a temperature of about 20–100° C. in the presence of at least 5% by weight of a member selected from the group consisting of $Al_2O_3 \cdot 2H_2O$, $Al_2O_3 \cdot 1H_2O$, $\gamma\text{-}Al_2O_3$ and mixtures thereof as catalyst until at least 1 mol of organic per acid per mol of ethylenic unsaturation to the epoxidized is consumed.

2. Improvement according to claim 1 in which said organic percarboxylic acid is a member selected from the group consisting of peralkanoic acids, perbenzoic acid, and monoperphthalic acids.

3. Improvement according to claim 1 which comprises forming the peracid in situ by reacting an organic acid with hydrogen peroxide.

4. Improvement according to claim 1 which comprises adding the organic peracid gradually to the reaction mixture.

5. Improvement according to claim 4 which comprises adding said organic peracid in drop-wise fashion.

6. Improvement according to claim 1 which comprises employing 1–2 mols of organic peracid for each ethylenic unsaturation to be epoxidized.

7. Improvement according to claim 1 wherein said epoxidation is effected in the presence of an inert solvent.

8. Improvement according to claim 7 in which said solvent is water.

9. Improvement according to claim 1 which comprises employing the aluminum oxide catalyst in a quantity of from 10–40 weight percent referred to the material to be epoxidized.

10. Improvement according to claim 1 which comprises employing the aluminum oxide in an amount of at least 5 weight percent referred to the material to be epoxidized.

11. Improvement according to claim 1 in which said aluminum oxide catalyst contains less than 1 weight percent of an inorganic alkaline reacting compound.

12. Improvement according to claim 11 in which said alkaline reacting compound is selected from the group consisting of sodium hydroxide, potassium hydroxide, sodium carbonate, potassium carbonate, sodium bicarbonate, and potassium bicarbonate.

13. In a process for preparing epoxidized products by reacting ethylenic compounds selected from the group consisting of monoethylenically and polyethylenically unsaturated aliphatic, cycloaliphatic, and aromatic hydrocarbons and monoethylenically and polyethylenically unsaturated alcohols, ethers, acids, esters, and ether-alcohols with an organic percarboxylic acid in the presence of a catalyst, the improvement which comprises reacting such an ethylenically unsaturated compound with an organic percarboxylic acid, at a temperature of about 20–100° C. in the presence of at least 5% by weight of a member selected from the group consisting of $Al_2O_3 \cdot 2H_2O$, $Al_2O_3 \cdot 1H_2O$, $\gamma\text{-}Al_2O_3$ and mixtures thereof as catalyst until at least one mol of organic peracid per mol of ethylenic unsaturation to be expoxidized is consumed and during said epoxidation driving off water present in the reaction mixture at a temperature below 100° C.

References Cited in the file of this patent

UNITED STATES PATENTS

| | | |
|---|---|---|
| 2,583,569 | Herzfeld et al. | Jan. 29, 1952 |
| 2,783,250 | Payne et al. | Feb. 26, 1957 |
| 2,786,854 | Smith et al. | Mar. 26, 1957 |
| 2,838,524 | Wilson | June 10, 1958 |
| 2,870,171 | Gable | Jan. 20, 1959 |
| 2,882,279 | Luvisi et al. | Apr. 14, 1959 |

OTHER REFERENCES

Marek et al.: Catalytic Oxidation of Organic Compounds in the Vaporphase, pp. 51, 169, 320 and 420 (1932).

Azeotropic Data, Advances in Chemistry Series No. 6, pages 6–12 (1952), published by American Chem. Soc.

Technique of Organic Chemistry, vol. IV, pages 317–355 (1951), published by Interscience Publishers, Inc., New York.